United States Patent [19]
Ott et al.

[11] 3,918,429
[45] Nov. 11, 1975

[54] APPARATUS FOR PROFILING WORK PIECES

[75] Inventors: Helmut Ott, Pfaffikon; Jaroslav Vlk, Uster, both of Switzerland

[73] Assignee: Gebr. Mägerle AG, Uster, Switzerland

[22] Filed: Apr. 2, 1975

[21] Appl. No.: 564,492

[30] Foreign Application Priority Data
Apr. 2, 1974 Switzerland.................. 4551/74

[52] U.S. Cl. ............................................ 125/11 PH
[51] Int. Cl.² ........................................ B24B 53/08
[58] Field of Search........... 125/11 R, 11 PH, 11 TP

[56] References Cited
UNITED STATES PATENTS
2,697,426  12/1954  Price................................ 125/11 PH
3,035,565  5/1962  Noble............................ 125/11 PH

*Primary Examiner*—Harold D. Whitehead
*Attorney, Agent, or Firm*—Finnegan, Henderson, Farabow and Garrett

[57] ABSTRACT

Apparatus for profiling work pieces in a one-to-one relationship from a template having the desired contour, the apparatus providing a vertically and horizontally movable tool carriage having mounted thereon in rigid relationship a template follower and profiling tool and a rotating hydraulic suspension system for the tool carriage that maintains a constant force on the template and workpiece and eliminates static friction during movement of the carriage as it follows the contour of the template.

11 Claims, 5 Drawing Figures

APPARATUS FOR PROFILING WORK PIECES

This invention relates to apparatus for profiling work pieces from a template. More particularly, this invention relates to profiling apparatus in which a rigid, one-to-one relationship is provided between the template follower and the profiling tool without variation in the force exerted on the template by the follower or on the workpiece by the tool as the follower and tool trace a path corresponding to the contour of the template.

Profiling apparatus and systems are known for copying templates in a one-to-one relationship and also for transmitting profiles in varying ratios by means of pantographs. The accuracy and surface quality obtained, however, particularly in the profiling of grinding wheels is often less than desired, mostly because of the large force exerted by the sensor on the template in a one-to-one system resulting in elastic deformations or the inaccuracy caused by expansion of the contour in a pantograph.

The object of the present invention is to provide profiling apparatus having a one-to-one relationship with the template that can achieve a more accurate profile on the work piece by providing a rigid connection between the template sensor and the profiling tool, the apparatus including an enlarged mass adjacent to the profiling tool to eliminate vibrations in the tool and a hydraulic suspension system for the tool carriage that maintains a constant and adjustable force on the template and that minimizes static friction as the carriage moves back and forth in response to the contour of the template regardless of its location resulting in more accurately reproduced work piece surfaces.

More particularly, there is provided apparatus for profiling work pieces comprising a template having a one-to-one relationship with the desired profile of the work piece, a tool carriage mounted for vertical and horizontal movement with respect to the template, a profiling tool and a template follower mounted to the carriage in rigid relationship for engagement with the work piece and template contour respectively, a weight of mass several times greater than the tool mounted adjacent the tool to reduce its vibration during operation, means for reciprocating the carriage in a horizontal direction, means for moving the carriage in a vertical direction between an operative position where the tool engages the work piece and the follower engages the template and an inoperative position out of such engagement, and a hydraulic suspension system for suspending the carriage in its operative position permitting the carriage to move vertically and the tool to exert a constant force on the work piece equal to that force only necessary to keep the follower in contact with the template, said suspension system including a cylinder portion and a piston portion and means for rotating at least one of said portions with respect to the other to eliminate static friction as the carriage moves back and forth vertically in response to the contour of the template.

The accompanying drawings which are incorporated in and constitute a part of the specification illustrate and embodiment of the invention and together with the description serve to explain the principles of the invention.

Reference will now be made in detail to the present preferred embodiment of the invention, an example of which is illustrated in the accompanying drawings.

Figure 1:
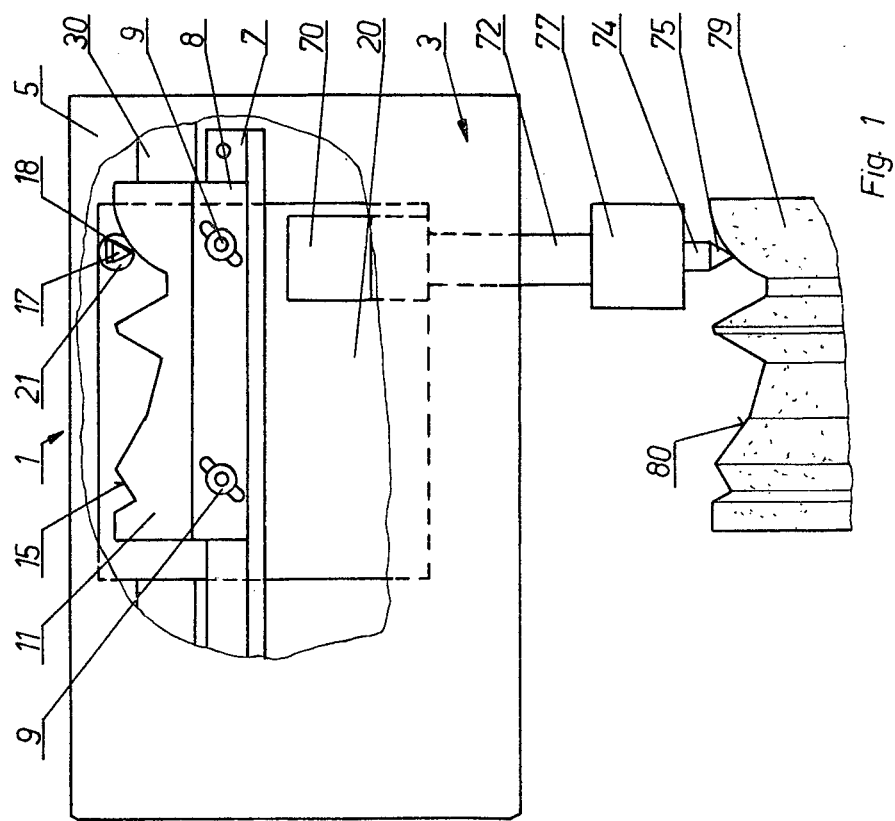
FIG. 1 is a front view of profiling apparatus constructed according to the present invention with the front wall partially removed and showing its relationship with and in a position for profiling a work piece, such as a grinding wheel.

As shown in FIG. 1, there is illustrated the profiling apparatus of the present invention generally indicated as 1 having a housing 3 in which the front wall 5 is partly removed, the apparatus being illustrated for use in the profiling of grinding wheels as the work piece. A track 7 is located in housing 3 to which a template 11 is interchangeable mounted by means of a clamping bar 8 and suitable fastening means having wing nuts 9. The upper part of template 11 has a contour 15 corresponding to the desired contour of the work piece and which is engaged by template follower 17. Follower 17 is provided with a hard metal knife edge 18 for following contour surface 15 but a rollertype follower may also be used in its place.

Follower 17 is mounted onto a tool carriage 20 which in turn is mounted in housing 3 for movement in a vertical and horizontal direction with respect to template 11. With reference to both FIGS. 1 and 2, a clamping support 70 diagrammatically illustrated in the drawings is mounted to one side of carriage 20 for the purpose of releasably clamping a support rod 72. The free end of rod 72 is equipped with a tool holder 74 for holding profiling tool 75; for instance a diamond cutting tool.

In accordance with an object of this invention and as can be seen in the drawings, profiling tool 75 and template follower 17 are connected in rigid relationship on carriage 20 to eliminate any variation in the distance between such elements during profiling operation. Furthermore and to provide profiling tool 75 with adequate inertia to protect it from vibrations, a large mass 77 having a weight many times greater than the weight of tool 75; for example, about 8kg. is mounted immediately adjacent tool 75. A work piece, such as a grinding wheel 79, which is to be profiled is located beneath tool 75, the wheel for purposes of illustration already indicating the desired profile 80 corresponding to the contour 15 of template 11.

In accordance with the invention, means are provided for reciprocating tool carriage 20 in a horizontal direction with respect to template 11. As embodied and with reference to FIGS. 2–3, this means includes a support plate 28 having spaced bores 33 and 34 mounted for sliding movement on guide rods 30 and 31 secured to housing 3. A hydraulic cylinder 36 is mounted to support plate 28 between guide rods 30 and 31 (see FIG. 3), the piston 38 of which is rigidly connected to housing 3.

Figure 2:
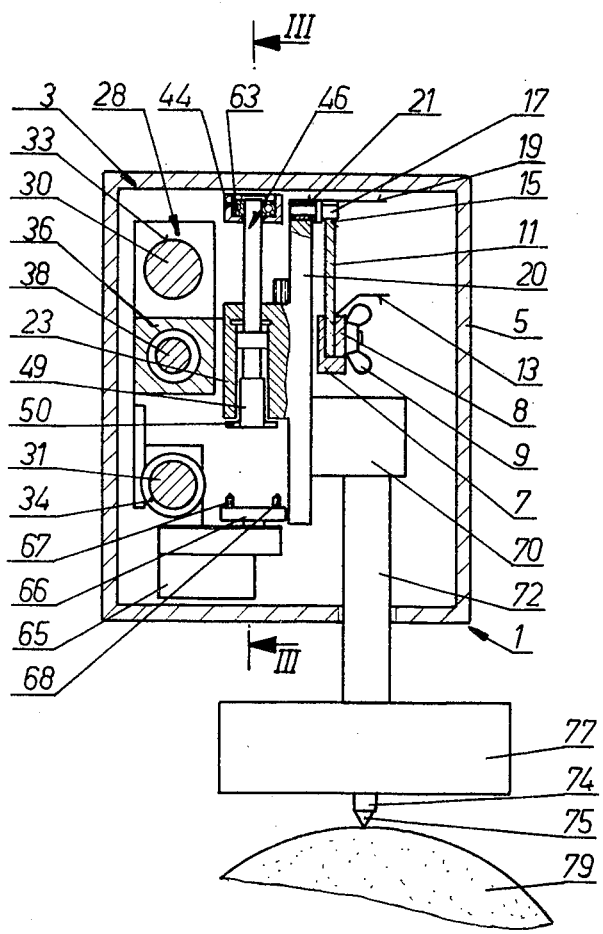
FIG. 2 is a side view of the apparatus of FIG. 1 and taken along the line II—II of FIG. 3.
Figure 3:
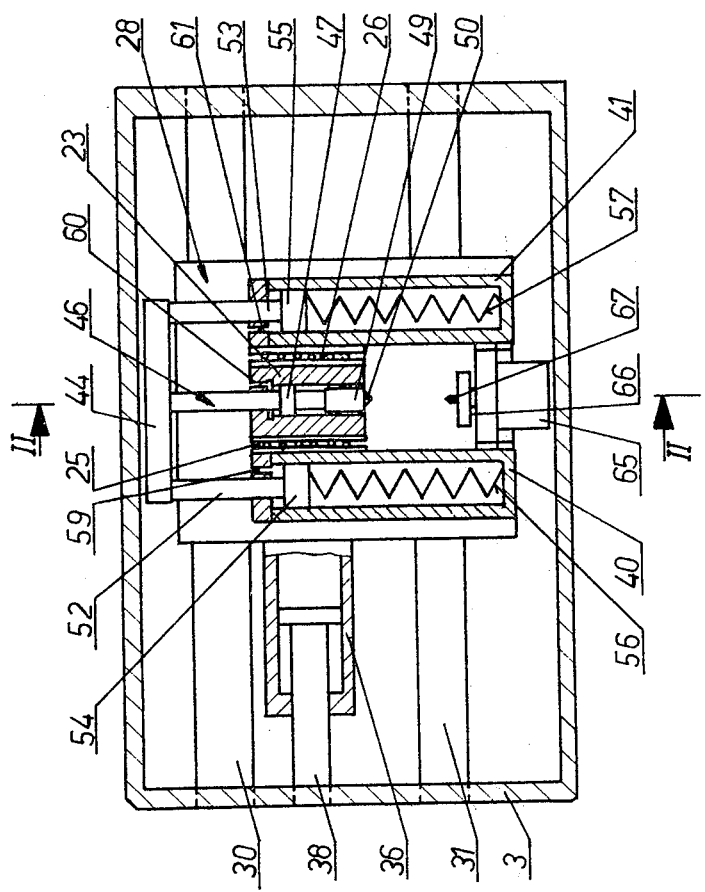
FIG. 3 is a view taken along the lines III—III of FIG. 2.

Tool carriage 20 is mounted to move up and down in a vertical direction on support plate 28 as shown in FIGS. 2 and 3 by a pair of low-friction, spaced, linear roller guides 25 and 26 operating between a rearwardly directed extension 23 of tool carriage 20 and a pair of spaced walls forming one wall of a pair of spaced cylinders 40 and 41 fixed to support plate 28 as more fully described below. Thus, tool carriage 20 is free to move up and down while support plate 20 pulls it from side to side so that it may accurately follow the vertical motions prescribed by contour 15.

In accordance with a further object of this invention, a hydraulic suspension system is provided for tool carriage 20 to prevent the weight of tool 74 and mass 77 from creating an excessive force on template 11 or work piece 79 and to permit the carriage to freely follow the up and down motions of the template. As embodied, this system includes a cylinder located in the extension 23 of carriage 20 (see FIGS. 2 and 3) having a corresponding piston portion 47. Piston 47 is provided with an extension rod 49 connecting the piston to a contact plate 50 at its lower end. In association with plate 50 and piston 47, as more fully described below in connection with the description of the operation of the apparatus, a motor 65 is located underneath cylinder 23 and mounted to support plate 28; the motor driving a rotating disc 66 having two pins 67 and 68 for engaging contact plate 50 and thereby rotating piston 47 when plate 50 is brought down into contact with disc 66. Piston 47 also is provided with a piston rod 46 rotatably supported in ball bearing 63 in a yoke beam 44.

Means are further provided for moving carriage 20 in a vertical direction between an operative position, as shown in FIG. 1, where tool 75 engages work piece 79 and template follower 17 engages the contour 15 of template 11 and in an inoperative position where the elements are removed from such engagement. As embodied and as best shown in FIGS. 2 and 3, support plate 28 is provided with a pair of spaced cylinders 40 and 41 having corresponding pistons 54 and 55 movable therein. Piston rods 52 and 53 extend out of cylinders 40 and 41 from pistons 54 and 55, respectively, which piston rods are connected by a common yoke beam 44. Yoke 44 also rotatably supports piston rod 46 of piston 47 as described above.

Connections 59, 60 and 61 schematically illustrated in FIG. 3 connect each of cylinders 40, 23 and 41, respectively, with a source of supply of hydraulic fluid and compression springs 56 and 57 bias pistons 54 and 55, respectively, in opposition to the force of such fluid. Thus cylinders 40 and 41 are single actuating cylinders, the springs maintaining said pistons and attached yoke 44 in their uppermost position in the absence of any fluid being supplied to the cylinders. As more fully described below, this also keeps carriage 20 in its uppermost and inoperative position.

To prevent variations and inaccurate profiling in case follower 17 leaves the contour surface 15 of a template 11 for any reason, follower 17 is connected to suitable switching means through an electrical cable 19; the follower being insulated with respect to carriage 20 by an insulating bushing 21 and template 11 is connected to the same switch means through cable 13. The switch means, in turn, controls the supply of fluid to hydraulic cylinders 40, 23 and 41, the contact between follower 17 and template 11 completing the connection between cables 19 and 13. Thus, if for any reason such contact is interrupted, the connection to the switching means is broken and the supply of fluid to the cylinders is terminated allowing compression springs 56 and 57 to immediately return carriage 20 and attached tool 75 to their inoperative position.

In operation and with reference to FIGS. 1–3, profiling apparatus 1 is located on a grinding machine on which the work piece, such as grinding wheel 79, is provided with a profile corresponding to that of template 11. From suitable control means, hydraulic fluid is initially supplied to hydraulic cylinders 40, 23 and 41 through connections 59, 60 and 61 to load pistons 54, 47 and 55. These pistons together with attached yoke beam 44 will then be lowered into operational position, compression springs 56 and 57 being correspondingly compressed in the process.

The downward movement of piston 47 releases cylinder 23 on carriage 20, allowing the carriage to descend under its own weight along roller guides 25 and 26 until knife edge 18 on follower 17 comes to rest on contour 15 of template 11. Continued lowering of piston 47 eventually brings contact plate 50 into engagement with the pins 67 and 68 on disc 66 being driven in a rotary motion by motor 65 so that piston 47 begins to rotate within cylinder 23. Pistons 54 and 55 descend downwardly under the influence of the hydraulic fluid supplied to their cylinders until yoke beam 44 reaches the top of the cylinders.

Carriage 20 is now in its operative position; piston 47 remaining fixed vertically and rotating with respect to support plate 28 while cylinder 23 and attached carriage 20 move up and down along roller guides 25 and 26 with respect to rotating piston 47 as they follow the contour of template 11. By rotating piston 47 with respect to cylinder 23, static friction between the piston and the cylinder, which would otherwise occur as the carriage changes vertical direction during its up and down motion, is eliminated, thus providing a more efficient and accurate transmission of the profile from the template to the work piece. By rotating piston 47 during profiling there will always be present the essentially lesser friction of motion which furthermore remains constant in contrast to the greater and varying static friction that would otherwise exist between piston 47 and cylinder 23.

With pistons 54 and 55 in fixed position, the pressure in cylinder 23 opposes the weight of carriage 20 and mass 77 so that it can thereby be used to control the amount of force exerted by follower 17 on template 11 and tool 75 on work piece 79. Ideally, such force is adjusted so that there is only enough downward force to keep follower 17 on template 11 and slight enough so that the follower may easily trace the peaks and troughs of contour 15 without clinging thereto on account of large frictional forces which would otherwise exist if the full weight of carriage 20 was exerted on template 11. Moreover, the hydraulic suspension system of the present invention as compared to a spring suspension system permits a constant force to be exerted on template 11 over the entire range regardless of the vertical location of the follower. In contrast and as readily apparent to those skilled in the art, a spring suspension system would vary the force depending upon the compression exerted on the springs, the force thereby varying depending on the location of the follower with respect to a normal position.

With the carriage in operative position, as described above, and support plate 28 in an extreme horizontal position to locate follower 17 on one side of template 11, support 28 is moved in a horizontal direction along guide rods 30 and 31 by loading the corresponding side of hydraulic cylinder 36, the speed of movement being controlled by the amount of fluid supplied to the cylinder.

This horizontal movement pulls knife edge 18 of follower 17 along contour 15 of template 11, moving carriage 20 up and down in accordance with the profile and transmitting the same in a one-to-one ratio to tool 75 where the latter performs the required cutting on work piece 79. With only such a slight force, vibration may exist in tool 75 and, thus, weight 77 is provided to prevent such vibrations from being transmitted to tool 75. It was found that with this apparatus an extraordinarily smooth operation and accurate reproduction by tool 75 of template 11 is achieved with a very acceptable profile surface on the work piece.

After template 11 has been traversed by follower 17, the amount of hydraulic fluid supplied to cylinder 23 is increased so that the pressure of the fluid will raise cylinder 23 together with carriage 20 and tool 75 off the work piece, the support 28 then returning to its initial extreme horizontal position by cylinder 36.

If for any reason during profiling there is a failure in the supply of fluid of the hydraulic cylinders, compression springs 56 and 57 will push yoke 44 and attached piston 47 upwardly carrying along with it cylinder 23 and carriage 20 and especially tool 75 into an inoperative position so that no damage will be done to the tool, the template, or the work piece by the sudden application of the weight of the carriage. Furthermore, if for any reason follower 17 is incapable of following contour 15 and even though there may not be any failure in the supply of hydraulic fluid if, for instance, there is excessive friction in guides 25 or 26 or there is a failure in the rotation of piston 47 and the excessive friction between piston 47 and cylinder 23 causes the follower to lift off contour 15, the power circuit completed through lines 13 and 19 by such connection will be broken and the supply of fluid to the cylinders will be terminated immediately returning the carriage to its inoperative position.

Thus, the profiling machine of the present invention automatically returns to a harmless, inoperative position if there is any kind of danger, preventing damage to the machinery as well as preventing incorrect work piece profiles.

Within certain limits, template 11 may be displaced and slanted with respect to bar 7 to simplify its adjustment.

Figure 4:
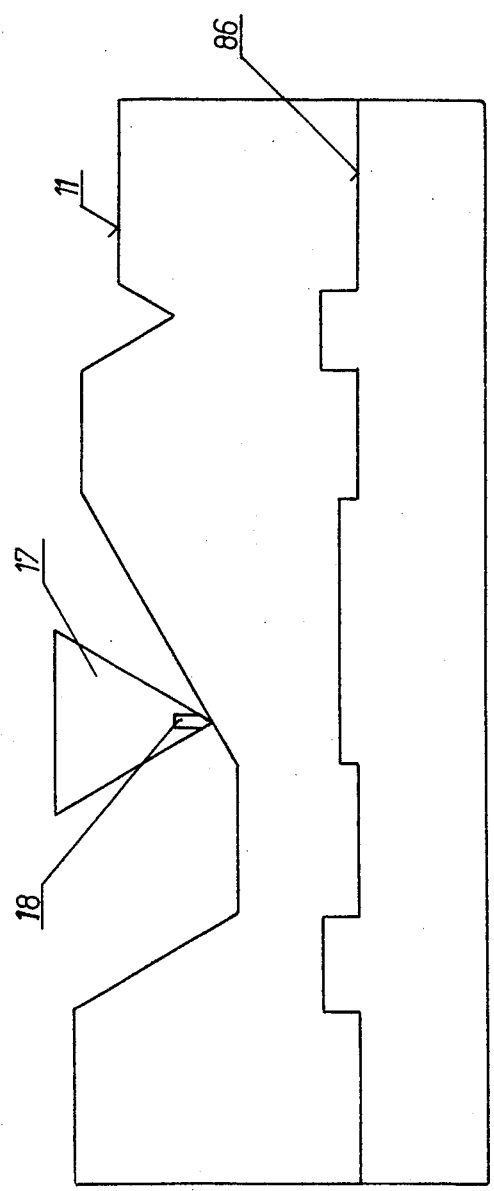
FIG. 4 is a diagrammatic view of a template and template follower with an auxiliary template for controlling the horizontal advance rate of the template follower.
Figure 5:
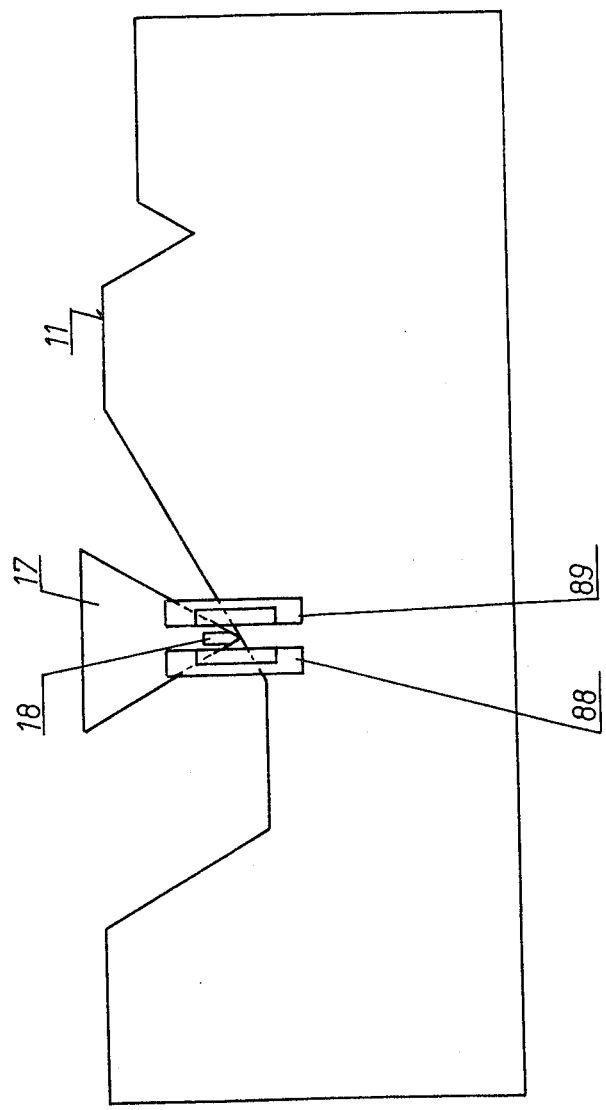
FIG. 5 is an alternative arrangement similar to that of FIG. 4 using magnetic induction heads instead of the auxiliary template.

It may also be desirable or necessary to keep constant the effective velocity of the carriage; that is the velocity vector of the horizontal and vertical speed components of tool 75 in the profile path. This may be achieved as shown, for example, in FIG. 4 by using an auxiliary template 86 that is profiled for contact with a suitable sensing device (not shown) which in turn controls a corresponding valve to the hydraulic system and, hence, adapts the horizontal speed of support plate 28 to the vertical speed of carriage 20 in such a manner that the resulting velocity vector will always remain constant. FIG. 5 shows an additional variation in this regard. In this instance, follower 17 is provided on either side with magnetic induction heads 88 and 89, the contour 15 of template 11 influencing the magnetic field of induction heads 88 and 89 to thereby control through suitable valve means the supply of fluid to cylinder 36 and the horizontal speed of carriage 20 so that the resulting velocity vector remains constant.

The invention in its broader aspects is not limited to the specific details shown and described and departures may be made from such details without departing from the principles of the invention without sacrificing its chief advantages.

What is claimed is:

1. Apparatus for profiling work pieces comprising a template having a one-to-one relationship with the desired profile of the work piece, a tool carriage mounted for vertical and horizontal movement with respect to the template, a profiling tool and a template follower mounted to the carriage in rigid relationship for engagement with the work piece and template contour respectively, a weight of mass several times greater than the tool mounted adjacent the tool to reduce its vibration during operation, means for reciprocating the carriage in a horizontal direction, means for moving the carriage in a vertical direction between an operative position where the tool engages the work piece and the follower engages the template and an inoperative position out of such engagement, and a hydraulic suspension system for suspending the carriage in its operative position permitting the carriage to move vertically and the tool to exert a constant force on the work piece equal to that force only necessary to keep the follower in contact with the template, said suspension system including a cylinder portion and a piston portion and means for rotating at least one of said portions with respect to the other to eliminate static friction as the carriage moves back and forth vertically in response to the contour of the template.

2. Apparatus according to claim 1, wherein the means for horizontally reciprocating the carriage includes a support plate slidably mounted for horizontal reciprocation, said carriage being mounted for sliding movement in a vertical direction on the support plate and the hydraulic suspension system acting between said support plate and the carriage.

3. Apparatus according to claim 2, wherein said cylinder portion of the hydraulic suspension system is fixed to the carriage and the piston portion remains relatively stationary with respect to the support plate when the carriage is in operative position, said piston rotating with respect to said cylinder.

4. Apparatus of claim 3, wherein the carriage is located above the work piece and the means for moving the carriage into and out of operative position includes at least one control hydraulic cylinder mounted to the support plate, the piston of which is interconnected with the piston of the suspension cylinder, whereby upward movement of the piston of the control cylinder pulls upwardly attached suspension piston raising with it its associated suspension cylinder fixed to the carriage and whereby downward movement of said control piston releases the suspension cylinder permitting the carriage to descend into its operative position.

5. The apparatus of claim 4, wherein said downward movement of the control piston also brings the suspension piston into contact with the means for rotating said piston.

6. Apparatus according to claim 5, wherein said rotating means includes a piston rod attached to the suspension piston and having a lower contact plate, motor means mounted on the support plate, and a rotating disc driven by said motor, said contact plate of the suspension piston engaging the disc when the carriage is in operative position to rotate said piston within the suspension cylinder.

7. Apparatus according to claim 1, including means to control the supply or fluid to said suspension cylinder in counterbalance the weight of the carriage to thereby control and keep constant the force exerted by the follower on the template and the tool on the work piece.

8. Apparatus according to claim 3, including constant force counterbalancing means to keep said carriage in an inoperative position against its weight in the absence of sufficient actuation of said hydraulic control means.

9. Apparatus according to claim 8, wherein said control hydraulic means is a single actuating cylinder which upon actuation overcomes the counterbalance means to lower the carriage, said counterbalancing means comprising compression springs biasing the pistons of the control cylinders and the carriage into an inoperative position.

10. Apparatus according to claim 9, including a pair of control cylinders mounted on opposite sides of and with their axes in the same plane as said suspension cylinder, the pistons of said cylinders being interconnected to move simultaneously.

11. Apparatus according to claim 8, characterized in that the template follower forms one terminal of an electrical power circuit and the template the other so that said circuit is closed only when the follower contacts the template, said power circuit controlling the supply of fluid to the control cylinders, whereby a break in the circuit during operation shuts off the supply of fluid and the counterbalance means moves the carriage into its inoperative position.

* * * * *